United States Patent Office 3,530,536
Patented Sept. 29, 1970

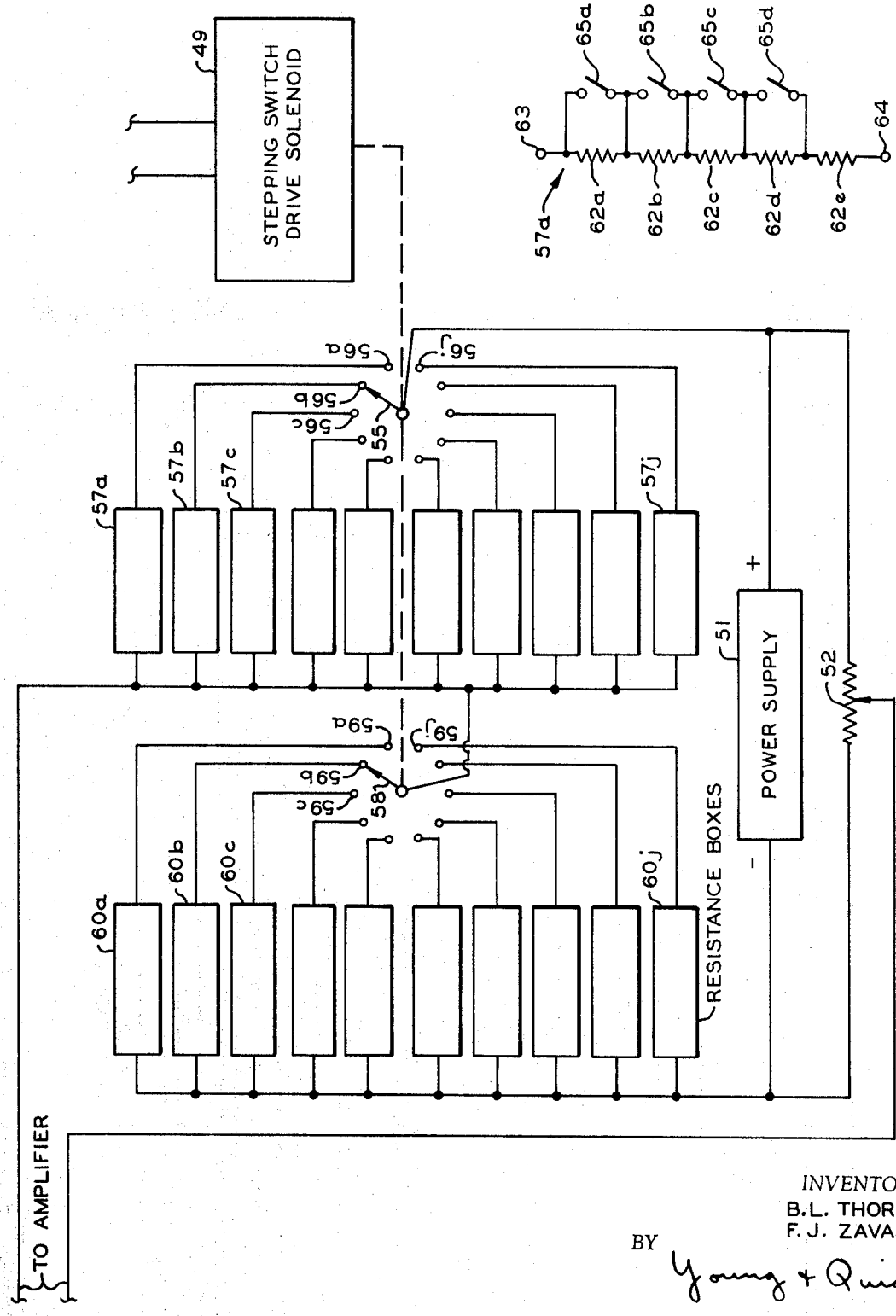

3,530,536
APPARATUS FOR EXTRUDING VARIABLE
THICKNESS MATERIALS
Baxter L. Thorman and Fred J. Zavasnik, Bartlesville, Okla., assignors to Phillips Petroleum Company, a corporation of Delaware
Filed Nov. 15, 1967, Ser. No. 683,299
Int. Cl. B29d 23/04
U.S. Cl. 18—14  6 Claims

ABSTRACT OF THE DISCLOSURE

Extrudate of variable cross sectional area is extruded through a die having a movable mandrel disposed therein to provide a variable area orifice. The resulting extrudate is withdrawn by a pulling mechanism which actuates a control system to move the mandrel with respect to the die. Extrudate of any desired thickness or configuration can be formed by suitably programming the control mechanism.

---

This invention relates to the production of extrudate of variable cross sectional area.

It is common practice to manufacture bottles and other containers by blow molding parisons of thermoplastic material. If the resulting container has an irregular configuration, it is desirable to avoid weak areas which can result from excessive stretching of certain sections of the parison. This is normally accomplished by extruding parisons which are thicker in the areas which are to be stretched the most when the container is blown. It has recently been found that bottles having high clarity can be formed from certain thermoplastic resins by the use of preformed parisons which are subsequently reheated to the orientation temperature of the polymer and then blown. The parisons can conveniently be formed by extruding a tubular material and cutting the resulting material into parisons of desired length. If irregularly shaped bottles are to be formed, some means must be provided for varying the thickness of the tubing cyclically as it is extruded.

The present invention provides an efficient means for extruding thermoplastic material in a controlled manner so as to provide extrudates of variable thickness. This is accomplished in one embodiment by moving a mandrel in an extrusion die to vary the orifice opening. Movement of the mandrel is controlled by a servo mechanism which positions the mandrel sequentially in accordance with the desired pattern of wall thickness. The servo mechanism is actuated in response to a pulling mechanism which removes the resulting extrudate. In this manner, the thicknesses of a tubing can be controlled to provide parisons of any desired configuration.

Accordingly, it is an object of this invention to provide improved apparatus for extruding materials having variable cross sectional areas.

Another object is to provide control mechanism for adjusting the opening in the orifice of an extrusion die in response to the withdrawal rate of material from the die.

Figure 1:
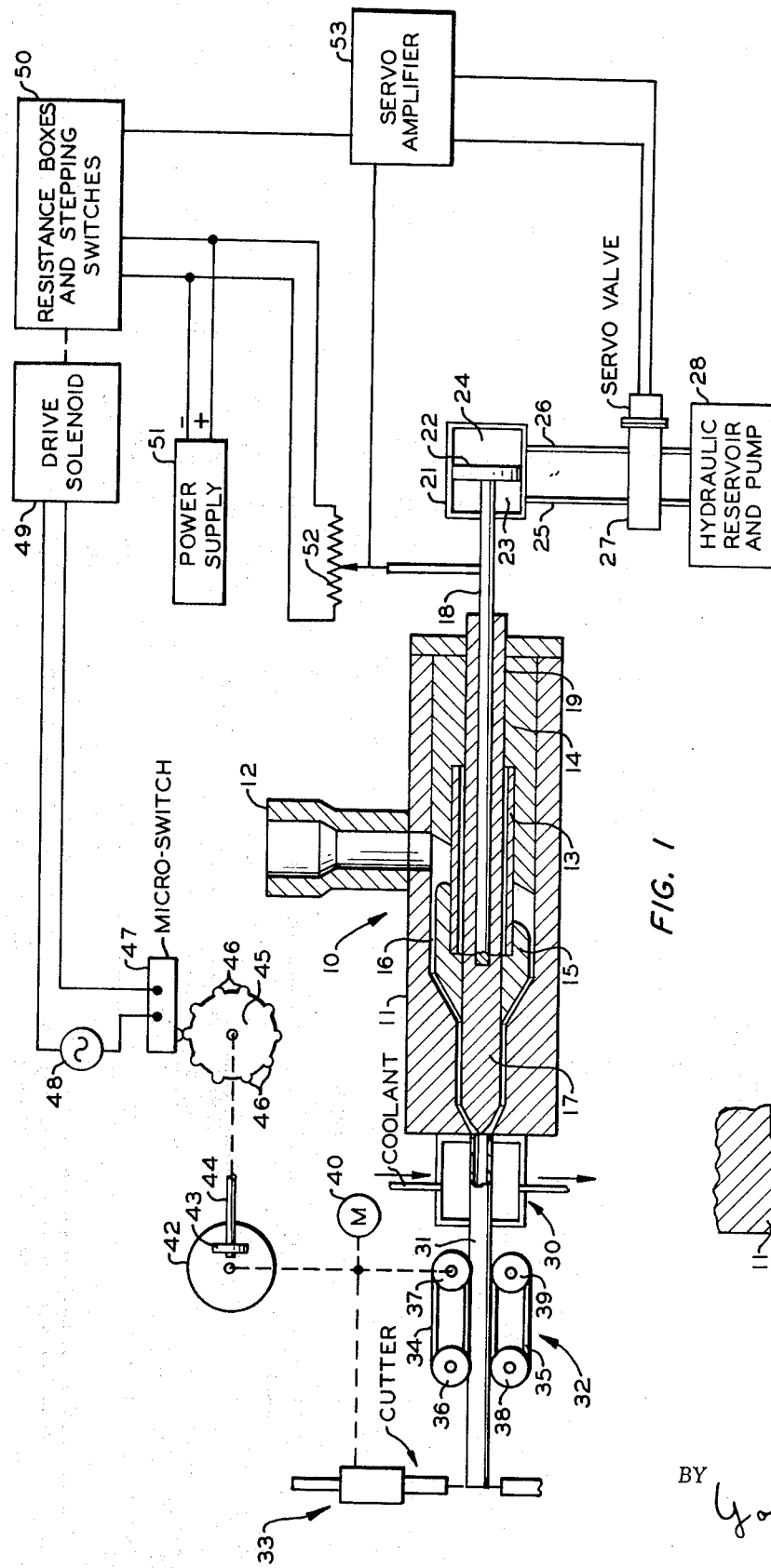
Figure 2:
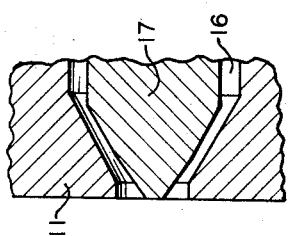

Other objects, advantages and features of the invention should become apparent from the following detailed description in conjunction with the accompanying drawing in which:

FIG. 1 is a schematic representation of an embodiment of the extrusion apparatus of this invention. FIG. 2 is an enlarged cross-sectional view of the nozzle of the crosshead die of FIG. 1. FIG. 3 is a schematic circuit drawing of a portion of the electrical control mechanism. FIG. 4 is a schematic circuit drawing of a resistance box employed in the circuit of FIG. 3.

Referring now to the drawing in detail and to FIG. 1 in particular, there is shown a crosshead die 10 which is employed to front tubing of thermoplastic material. Molten thermoplastic material is introduced into the housing 11 of the die through an inlet port 12 from an extruder (not shown). A first sleeve 13 is positioned within housing 11 by means of a hollow plug 14. Sleeve 14 supports an annular plug 15 which is spaced from the wall of housing 11 to form a passage 16. A mandrel 17 is positioned for longitudinal movement through the housing by means of plug 15. A shaft 18 extends through a sleeve 19 within plug 14 and is secured at one end to mandrel 17. The end of housing 11 is tapered to form an outlet annulus through which the thermoplastic material is extruded. As illustrated in FIG. 2, housing 11 and mandrel 17 are of such configuration that the cross sectional area of the orifice is varied in response to longitudinal movement of the mandrel through the housing. This serves to vary the thickness of the resulting extruded tubing.

The second end of shaft 18 extends into a cylinder 21 and supports a piston 22 which engages the inner wall of the cylinder. As illustrated, piston 22 divides the cylinder into two chambers 23 and 24. Hydraulic fluid can be introduced into and withdrawn from chambers 23 and 24 by respective conduits 25 and 26. By selectively controlling the introduction into and withdrawal of hydraulic fluid from the two chambers, the position of piston 22 can be manipulated, and thereby alter the annular opening of the tubular die. This fluid flow is controlled by a servo valve 27 which is disposed in conduits 25 and 26, the latter extending to a hydraulic reservoir and pump 28.

The thermoplastic material extruded from housing 11 passes through a coolant bath 30, in which it is cooled and solidified into a tube 31. This bath can be provided with a guide tube, not shown, to support the extrudate before it solidifies. A puller 32 is provided to withdraw the tubing from the extruder at a constant speed and to direct the tubing to a cutting mechanism 33. Puller 32 can be in the form of two movable belts 34 and 35 which engage the tubing and which extend around respective guide wheels 36, 37 and 38, 39. One or more of these guide wheels is rotated by a motor 40 to provide the pulling action. Cutter 33 can also be actuated by motor 40 so as to be synchronized with the rate of tubing withdrawal from the extruder. The resulting tubing is thus cut into segments to form parisons for subsequent blow molding operations.

As previously mentioned, it is desirable to vary the thickness of the parisons when irregularly shaped objects are to be formed. This is provided in accordance with the present invention by controlling movement of mandrel 17 with respect to the die opening in housing 11. The control mechanism of this invention is adjustable so that parisons of any desired variable cross sectional area can be formed. The control mechanism is actuated by rotation of a wheel 42 which is mechanically coupled to puller 32 so as to be rotated at a speed which is proportional to the rate of tubing withdrawal. Rotation of wheel 42 rotates a second wheel 43 which is in engagement therewith. Wheel 43 is connected by means of a shaft 44 to a cam 45 which is provided with a plurality of lobes 46. Lobes 46 actuate a microswitch 47 when the cam is rotated. The control mechanism thus far described is constructed and adjusted such that cam 45 makes one revolution each time a length of tubing is extruded which corresponds to twice the length of a final parison. This procedure is desirable because the two ends of the parison normally are of different thickness. The second half of the cam program thus repeats in reverse to avoid abrupt changes at the end of each parison. If cam 45 is provided with ten lobes, as illustrated, switch 47 will be actuated ten times during each revolution of the cam and thereby provide ten settings for the control mechanism. This provides five settings for each parison. Of course, a larger number of settings can be provided if necessary.

Switch 47 serves to connect a power source 48 to a stepping switch drive solenoid 49 which selectively inserts individual resistance boxes into an electrical servo control circuit. This control circuit is actuated from a power supply 51, and includes a feedback potentiometer 52 and a servo amplifier 53. As illustrated in FIG. 3, power supply 51 is applied across the end terminals of potentiometer 52, the two arms of which form respective arms of a bridge network. The contactor of potentiometer 52 is connected to the first input terminal of a servo amplifier 53 of FIG. 1. The first terminal of power supply 51 is also connected to a stepping switch 55 which is adapted to engage contacts 56a, 56b ... 56j in sequence when solenoid 49 is energized in response to rotation of cam 45. Contact 56a is connected to the first terminal of a resistance box 57a. The second terminal of resistance box 57a is connected to a second stepping switch 58 and to the second input of servo amplifier 53. Stepping switch 58 is mechanically connected to stepping switch 55 so as to move therewith in response to solenoid 49 being energized. Switch 58 engages contacts 59a, 59b ... 59j in sequence. Contact 59a is connected to the first terminal of a resistance box 60, the second terminal of which is connected to power supply 51 and to potentiometer 52. Resistance boxes 57b, 57c ... 57j are connected between switch 58 and respective contacts 56b, 56c ... 56j. Similarly, resistance boxes 60b, 60c ... 60j are connected between power supply 51 and respective contacts 59b, 59c ... 59j.

From an inspection of FIG. 3, it can be seen that the resistance boxes and potentiometer 52 form a bridge network with power supply 51, the output of which is connected to servo amplifier 53. The resistance in each of the boxes can be adjusted such that various combinations of resistances are connected in the circuit when the stepping switch is rotated in response to cam 45 being rotated. Each of the resistance boxes can be of the configuration illustrated in FIG. 4, for example. A plurality of resistances 62a, 62b, 62c, 62d and 62e are connected in series between terminals 63 and 64 of the resistance box. Switches 65a, 65b, 65c and 65d are connected in parallel with respective resistors 62a, 62b, 62c and 62d. These switches can be closed selectively to vary the amount of resistance in the circuit between terminals 63 and 64. It should thus be evident that a wide range of resistance is possible in each box, particularly if the individual resistors are of different sizes. The individual switches can be manipulated manually, or they can be manipulated automatically by the use of punched cards, for example, which actuate relays to close the respective switches. By selective adjustments of the resistance in the boxes, various outputs of the bridge circuit can be obtained for selective programming of the control unit.

The output signal from servo amplifier 53 of FIG. 1 serves to adjust valve 27 to control the position of piston 22 in cylinder 21. Amplifiers and servo valves of this type are known in the art and are available commercially. For example, such a servo amplifier of this type is described in Bulletin I–3093–S of Vickers, Incorporated, P.O. Box 302, Troy Mich. 48084, and a servo valve of this type is described in Bulletin I–3060–S of Vickers, Incorporated, 14420 Linwood Ave., Detroit, Mich. 48238. The resistance boxes in the bridge network are adjusted initially to provide the desired output signals to servo amplifier 53. As piston 22 is moved to move mandrel 17, feedback potentiometer 52 is adjusted to restore a balanced condition in the bridge.

An important feature of this invention resides in controlling the orifice size of the tubing die in response to the withdrawal rate of the extruded tubing. This assures that the resulting parisons will each have the desired configuration from one end to the other. Although the invention has been described with respect to forming parisons from hollow tubing, the invention can be applied to forming extrudates of any desired configuration by use of extrusion dies of appropriate shapes.

While this invention has been described in conjunction with a presently preferred embodiment, it should be evident that it is not limited thereto.

What is claimed is:

1. Apparatus for forming an extrudate of variable cross sectional configuration comprising:
   an extruder having a die with a mandrel movable therein to form an outlet nozzle of variable configuration;
   pulling means positioned to engage extrudate removed from said die and to transport such extrudate away from said extruder;
   means in engagement with said mandrel to move said mandrel with respect to said die; and
   means responsive to movement of said pulling means to acuate said means to move said mandrel so as to vary the configuration of said nozzle and thereby the cross sectional configuration of the resulting extrudate, said means to actuate comprising servo means having the output thereof connected to said mandrel, adjustable means connected to the input of said servo means to provide a plurality of input signals thereto, and means connected to said pulling means to actuate said adjustable means responsive to movement of said pulling means.

2. The apparatus of claim 1, further comprising extrudate cutting means spaced from said pulling means to cut the extrudate transported by said pulling means into segments of predetermined length, and means to synchronize the operation of said cutting means with said pulling means.

3. The apparatus of claim 1 wherein said die is of generally circular configuration at every point on the longitudinal axis of the die and said mandrel is of generally circular cross section at every point on the longitudinal axis thereof, said mandrel being centrally positioned within said die and adapted to move along the longitudinal axis of the die, the cross sectional areas of said die and said mandrel being such that the thickness of tubing extruded from said die varies when said mandrel is moved relative to said die.

4. The apparatus of claim 1 wherein said servo means and said adjustable means include an electrical bridge network having a plurality of first and second variable resistance elements selectively forming two arms thereof, respectively; a potentiometer, the two arms thereof forming additional arms of the bridge network; means to move the contactor of said potentiometer in response to movement of said mandrel; and means to connect different pairs of said first and second resistance elements in said bridge network in sequence responsive to movement of said pulling means.

5. The apparatus of claim 4 wherein said means to connect comprises stepping switch means, a cam having a plurality of lobes, means to rotate said cam in response to movement of said pulling means, and means engaged by said cam to actuate said stepping switch means.

6. The apparatus of claim 1 wherein said servo means includes a source of hydraulic fluid under pressure, a cylinder positioned to enclose the end of said mandrel remote from said nozzle, a piston on the end of said mandrel to move through said cylinder, and means to control passage of hydraulic fluid between said source and the two sides of said piston within said cylinder.

References Cited

UNITED STATES PATENTS

| | | |
|---|---|---|
| 2,044,961 | 6/1936 | Warner. |
| 2,491,589 | 12/1949 | Slaughter. |
| 2,607,074 | 8/1952 | Slaughter. |
| 2,940,126 | 6/1960 | Sheridan. |
| 3,283,363 | 11/1966 | Turner. |

WILLIAM J. STEPHENSON, Primary Examiner

U.S. Cl. X.R.

18—2